US011949234B2

(12) United States Patent
Ma et al.

(10) Patent No.: US 11,949,234 B2
(45) Date of Patent: Apr. 2, 2024

(54) METHOD FOR MAKING SPATIO-TEMPORAL COMBINED OPTIMAL SCHEDULING STRATEGY OF MOBILE ENERGY STORAGE (MES) SYSTEM

(71) Applicants: Electric Power Science & Research Institute of State Grid Tianjin Electric Power Company, Tianjin (CN); State Grid Tianjin Electric Power Company, Tianjin (CN); State Grid Corporation of China, Beijing (CN)

(72) Inventors: Shiqian Ma, Tianjin (CN); Bin Wu, Tianjin (CN); Yun Liu, Tianjin (CN); Xianxu Huo, Tianjin (CN); Yi Ding, Tianjin (CN); Lei Wu, Tianjin (CN); Tianhao Wang, Tianjin (CN)

(73) Assignees: Electric Power Science & Research Institute of State Grid Tianjin Electric Power Company, Tianjin (CN); State Grid Tianjin Electric Power Company, Tianjin (CN); State Grid Corporation of China, Beijing (CN)

( * ) Notice: Subject to any disclaimer, the term of this patent is extended or adjusted under 35 U.S.C. 154(b) by 398 days.

(21) Appl. No.: 17/525,862

(22) Filed: Nov. 12, 2021

(65) Prior Publication Data
US 2022/0209533 A1 Jun. 30, 2022

Related U.S. Application Data

(63) Continuation-in-part of application No. PCT/CN2021/113907, filed on Aug. 20, 2021.

(30) Foreign Application Priority Data

Dec. 28, 2020 (CN) .......................... 202011579799.6

(51) Int. Cl.
H02J 3/00 (2006.01)
H02J 3/08 (2006.01)

(52) U.S. Cl.
CPC ............ *H02J 3/0073* (2020.01); *H02J 3/003* (2020.01); *H02J 3/08* (2013.01)

(58) Field of Classification Search
CPC ............. H02J 3/003; H02J 3/0073; H02J 3/08
(Continued)

(56) References Cited

U.S. PATENT DOCUMENTS 11,180,048 B1 * 11/2021 Lu ........................... B60L 55/00
2013/0226637 A1 * 8/2013 Bozchalui ............... B60L 53/63
705/7.12

(Continued)

FOREIGN PATENT DOCUMENTS

CN 111082444 A 4/2020
CN 111864775 A 10/2020

OTHER PUBLICATIONS

IEEE: Optimal Operation of Mobile Energy Storage Devices to Minimize Energy Loss in a Distribution System, By: Young Kwon (Year: 2018).*

Primary Examiner — Jigneshkumar C Patel (57) ABSTRACT

A method for making a spatio-temporal combined optimal scheduling strategy of a mobile energy storage (MES) system includes: inputting data of a power system, a traffic system, and an MES system; setting a time interval, and initializing a time interval counter; inputting real-time fault, traffic, and MES data; and performing rolling optimization and solving, and delivering regulation decision instructions of the MES system, till a fault is removed. The core of the present disclosure is to propose a spatio-temporal combined optimal model of the MES system to describe spatio-temporal coupling statuses of an energy storage vehicle, a traffic network, and a power distribution network. The (Continued)

present disclosure provides guidance for an optimal scheduling decision of the MES system by properly regulating a traveling path and charging and discharging power of the MES system, thereby supporting high-reliability operation of the power distribution network.

2 Claims, 8 Drawing Sheets

(58) Field of Classification Search
USPC .......................................................... 700/286
See application file for complete search history.

(56) References Cited

U.S. PATENT DOCUMENTS

2014/0375272 A1* 12/2014 Johnsen .................. B60L 58/19
320/136
2020/0126168 A1* 4/2020 Macklis ................ H02J 7/0013

* cited by examiner

(a) Path (b) Battery capacity (c) Power

FIG. 7

(a) Path (b) Battery capacity (c) Power

FIG. 8

METHOD FOR MAKING SPATIO-TEMPORAL COMBINED OPTIMAL SCHEDULING STRATEGY OF MOBILE ENERGY STORAGE (MES) SYSTEM

CROSS REFERENCE TO RELATED APPLICATIONS

The present application is a Continuation-In-Part Application of PCT Application No. PCT/CN2021/113907 filed on Aug. 20, 2021, which claims the benefit of Chinese Patent Application No. 202011579799.6 filed on Dec. 28, 2020. All the above are hereby incorporated by reference in their entirety.

TECHNICAL FIELD

The present disclosure relates to a method for making an optimal scheduling strategy of a mobile energy storage (MES) system, and in particular, to a method for making a spatio-temporal combined optimal scheduling strategy of an MES system oriented to a high-reliability power distribution network.

BACKGROUND

In recent years, with the change of an energy structure and the rapid development of new energy technologies, the energy storage technology resolves a problem that energy production and consumption are out of synchronization in terms of time, and plays an important strategic role in a power system. As an upgrade and a supplement of a traditional fixed energy storage system, an MES system can be regulated and moved more flexibly, and has been preliminarily applied to alleviate and eliminate seasonal peak load, restore an emergency power supply, expand a heavily-loaded area served by one transformer, control a voltage, and the like. With the gradual development of new infrastructure, technologies such as 5G communication, Internet of Things (IoT), cloud computing, and Beidou navigation have been put into practical application to perform real-time positioning and regulation on the MES system. Giving full play to spatio-temporal flexibility of the MES, realizing friendly interaction and optimal regulation of the MES system under a traffic network and a power distribution network, and improving power supply reliability of the power distribution network are important application scenarios to be urgently developed for the MES system.

After a power cut caused by a fault, an overhauling-specific power cut, and other events occur in the power distribution network, an MES vehicle can be connected orderly in a plug and play manner according to an optimal regulation strategy to meet emergency power needs of users, so as to build a more reliable strong and intelligent power distribution network. Compared with the traditional fixed energy storage system that can only provide an emergency power supply for key load, the MES system is green, clean, and environment-friendly, and can realize a wide assurance range and flexible allocation and cover a whole area of the power distribution network. Emission and noise of a diesel generator are difficult to meet a low-carbon environmental protection standard in an urban core area, and application of the diesel generator in an urban power distribution network is limited. With a flexible mode, the MES system not only can guarantee power supply, but also can participate in peak and valley arbitrage, peak-load shifting, and other services of a power grid, thereby realizing high resource utilization and avoiding idle resources. In addition, with the development of new materials and new technologies, energy storage costs are further reduced, and the MES system has more prominent advantages.

Optimal regulation of the MES system mainly considers two aspects: path planning and battery power decision making. Path planning is to optimally select a traveling path and an access destination of the MES vehicle. Battery power decision making is to make an optimal decision for charging and discharging time and power of an MES battery. However, existing research on an optimal scheduling strategy of an energy storage system is mostly intended to improve toughness, and there is still a lack of relevant research specifically for improvement of reliability. Spatio-temporal optimal regulation, of the MES system, for improving the reliability is essentially large-scale mixed integer nonlinear programming. A traffic condition, a fault position, a vehicle position, and a battery capacity constitute a complex spatio-temporal coupling relationship of "MES system-traffic road-power distribution network". In this way, variable constraints of the whole large-scale mixed integer nonlinear programming have high spatio-temporal coupling complexity, and the model is complex and difficult to solve.

In addition, operation and scheduling of the MES system are characterized by a wide spatio-temporal distribution, many coupling constraints, and strong unpredictability. For example, prediction accuracy of fault information such as expected fault duration is low, traffic information such as road congestion and traffic accidents is accidental, and the MES vehicle may not reach a predetermined position as planned. The above uncertain factors of the power grid, the traffic, and the MES system will bring a great deviation to operation and regulation. An optimal regulation effect cannot be guaranteed only according to a regulation plan made at the beginning of the fault. Therefore, an efficient and accurate method for making a spatio-temporal combined optimal scheduling strategy of an MES system is of great significance to system planning, operation, and scheduling, and is a difficult problem to be resolved by researchers and technicians in this field.

SUMMARY

To overcome the defects in the prior art and improve reliability of a power distribution network, the present disclosure provides a method for making a spatio-temporal combined optimal scheduling strategy of an MES system.

The present disclosure adopts the following technical solution to resolve the technical problem:

A method for making a spatio-temporal combined optimal scheduling strategy of an MES system includes the following steps:

step 1: inputting data of a power system, a traffic system, and an MES system, specifically including: a line parameter, load data, generator data, and a topological structure of the power system, a road parameter and a topological structure of the traffic system, a quantity of MES vehicles, a capacity of an MES battery, an upper limit of output active power, an upper limit of output reactive power, upper and lower capacity limits of the battery, charging and discharging efficiency of the battery, and an average traveling speed of an MES vehicle;

step 2: setting a time interval $\Delta t$, and initializing a time interval counter N to 0 and initial time t to 0;

step 3: inputting real-time fault, traffic, and MES data, specifically including: a position of a power line fault, expected repair time, a road congestion coefficient of the traffic system, and a real-time position and battery capacity of the MES vehicle;

step 4: optimizing and solving an optimal regulation model of the MES system, and delivering regulation decision instructions of the MES system, including a path instruction and a power instruction; and step 5: if the fault still exists after NΔt, setting N=N+1, and returning to step 3; otherwise, terminating a process of making a scheduling strategy.

Step 4 specifically includes:

obtaining a regulation decision of the MES system by solving the optimal regulation model of the MES system, and obtaining, from a perspective of reliability, a best regulation solution of the MES vehicle under a constraint on coupling between a power distribution network and a traffic network, where corresponding optimal regulation instructions include a path instruction and a power instruction;

establishing the optimal regulation model of the MES system, where an objective function of the model is set to a minimum load reduction in a time set [NΔt, T], and is specifically expressed as:

$$\min f = \sum_{t \in T} \sum_{i \in E_n} P_{i,t}^{LS} \Delta t + \lambda \sum_{t \in T} \sum_{ij \in E_b} r_{ij} I_{ij,t} \Delta t \tag{1}$$

where in the formula (1), $E_n$ and $E_b$ represent a node set and a branch set in the power distribution network respectively, PLS i,t represents a load reduction of a node i at a time point t, $r_{ij}$ and $I_{ij,t}$ represent resistance of a branch ij and a square of a current of the branch ij at the time point t respectively, Δt represents the time interval, $$\sum_{t \in T} \sum_{i \in E_n} P_{i,t}^{LS} \Delta t$$

represents a load reduction of the power distribution network, $$\lambda \sum_{t \in T} \sum_{ij \in E_b} r_{ij} I_{ij,t} \Delta t$$

is used to ensure accuracy of solving the model after second-order cone relaxation optimization, and λ, represents a real number greater than 10; and setting model constraints, including a path traffic constraint, an energy storage battery constraint, and a power flow constraint of the power distribution network, where the path traffic constraint is that the MES vehicle needs to complete a traveling process according to the delivered path instruction; $p_{i,s,t}$ is a binary decision variable, indicating whether an MES system s is located on the node i at the time point t; and when $p_{i,s,t}$=1, it indicates that the MES system s is located on the node i at the time point t;

$$\sum_{i \in W_n} p_{i,s,t} \leq 1 \, \forall s \in \Omega_s, t \in T \tag{2}$$

where in the formula (2), $W_n$ represents a set of nodes in the traffic network, $\Omega_s$ represents a set of MES vehicles, and a traveling track of the MES vehicle also needs to meet a constraint of the traffic network to ensure that the MES vehicle can reach an expected position within specified time, as shown below:

$$L_{i,j,t} = \text{round}\left(\sum_{k \in W_{ij}} \frac{d_k}{\gamma_{k,t} \cdot v}\right) \forall i, j \in W_n, t \in T \tag{3}$$

$$p_{i,s,t} + p_{j,s,t+\tau} \leq 1 \forall i \in W_n, j \in W_n, \tag{4}$$
$$\tau \in [1, \ldots, \min\{L_{i,j,t}, T-t\}], s \in \Omega_s$$

where in the formulas (3) and (4), $L_{i,j,t}$ represents time required by the MES vehicle to travel from the node i to a node j at the time point t; $W_{ij}$ represents a set of roads within a least time-consuming path between the node i and the node j, and is obtained based on a floyd algorithm; $\gamma_{k,t}$ represents a congestion coefficient of a road k at the time point t, and is used to measure an actual traffic capacity of the road based on traffic congestion, road construction, and other factors; $d_k$ and v represent a length of the road k and the average traveling speed of the MES vehicle respectively; and $P_{j,s,t+\tau}$ represents whether the mobile storage energy system s is located on the node j at the time point t;

the energy storage battery constraint is related to the power instruction, the power instruction indicates active discharging power PM i,s,t and reactive discharging power Q M i,s,t of the energy storage battery after the MES vehicle reaches a destination and is connected to a power grid, and the energy storage battery constraint includes capacity constraints represented by formulas (5) and (6) and power constraints represented by formulas (7) to (9), as shown below:

$$E_{s,t} = E_{s,t-1} - \sum_{i \in E_n} \frac{P_{i,s,t}^M}{\eta_{dis}} \tag{5}$$
$$\forall i \in E_n, s \in \Omega_s, t \in T$$

$$\sigma_{min} E_s \leq E_{s,t} \leq \sigma_{max} E_s \tag{6}$$
$$\forall s \in \Omega_s, t \in T$$

$$-M \cdot p_{sta,s,t} \cdot P_s^{max} \leq P_{sta,s,t}^M \leq 0 \tag{7}$$
$$\forall s \in \Omega_s, t \in T$$

$$0 \leq \frac{P_{i,s,t}^M}{\eta_{dis}} \leq p_{j,s,t} \cdot P_s^{max} \tag{8}$$
$$\forall i \in E_n, j \in W_n, s \in \Omega_s, t \in T$$

$$-p_{j,s,t} Q_s^{max} \leq Q_{i,s,t}^M \leq p_{j,s,t} Q_s^{max} \tag{9}$$
$$\forall i \in E_n, j \in W_n, s \in \Omega_s, t \in T$$

where in the formulas (5) to (9), $E_{s,t}$ represents a battery capacity of the MES system s at the time point t, PM i,s,t and Q M i,s,t represent active and reactive charging and discharging power of the MES system s on the node i at the time point t respectively, $\eta_{dis}$ represents discharging efficiency, $E_s$ represents the capacity of the MES battery, $\sigma_{max}$ and $\sigma_{min}$ represent the upper and lower capacity limits of the MES battery respectively, Pmax s and Q max s represent upper limits of active and reactive discharging power of the MES system s respectively, M represents a real number greater than 100, and sta represents a position of a central MES station; and the power flow constraint of the power distribution network is that a power distribution system needs to meet power balance constraints represented by formulas (10) to (13) and operation safety constraints represented by formulas (14) and (15) after the MES system is orderly connected to the power distribution network in a plug and play manner, as shown below:

$$\sum_{ji \in E_b} (P_{ji,t} - r_{ij}I_{ji,t}) + P_{i,t}^L - P_{i,t}^{LS} - P_{i,t}^G - \sum_{s \in \Omega_s} P_{i,s,t}^M = \sum_{ik \in E_b} P_{ik,t} \quad (10)$$

$$\forall i \in E_n, s \in \Omega_s, t \in T$$

$$\sum_{ji \in E_b} (Q_{ji,t} - x_{ij}I_{ji,t}) + Q_{i,t}^L - Q_{i,t}^{LS} - Q_{i,t}^G - \sum_{s \in \Omega_s} Q_{i,s,t}^M = \sum_{ik \in E_b} Q_{ik,t} \quad (11)$$

$$\forall i \in E_n, s \in \Omega_s, t \in T$$

$$U_{i,t} - U_{j,t} + (r_{ij}^2 + x_{ij}^2)I_{ij,t} - 2(r_{ij}P_{ij,t} + x_{ij}Q_{ij,t}) = 0 \quad (12)$$

$$\forall i \in E_n, j \in E_n, ij \in E_b, t \in T$$

$$\|[2P_{ij,t} \ 2Q_{ij,t} \ I_{ij,t} \ -U_{i,t}]^T\|_2 \le I_{ij,t} + U_{i,t} \quad (13)$$

$$\forall i \in E_n, ij \in E_b, t \in T$$

where in the formulas (10) to (13), $x_{ij}$ represents reactance of the branch if, $P_{ij,t}$ and $Q_{ij,t}$ represent active power and reactive power flowing from the node i to the node j at the time point t respectively, $U_{i,t}$ represents a square of a voltage of the node i at the time point t, PL i,t and $Q$ L i,t represent active power and reactive power of load on the node i at the time point t respectively, PLS i,t and $Q$ LS i,t respectively represent active power and reactive power that are reduced for the load on the node i at the time point t, and PG i,t and $Q$ G i,t respectively represent active power and reactive power that are injected by a generator on the node i at the time point t; and $$U_i^{min} \le U_{i,t} \le U_i^{max} \forall i \in E_n, t \in T \quad (14)$$

$$I_{ij,t} \le I_{ij}^{max} \forall ij \in E_b, t \in T \quad (15)$$

where in the formulas (14) and (15), Umax i and Umin i represent upper and lower limits of a square of a voltage of the node i respectively, and Imax ij represents a square of a maximum allowable current of the branch ij.

The present disclosure has the following advantages and beneficial effects:

The MES system has unique spatio-temporal flexibility. Important support for emergency power supply and reliability improvement of the power distribution network can be provided by properly regulating the traveling path and charging and discharging power of the MES system. To meet a demand for green and efficient reliability improvement of the power distribution network, the present disclosure proposes a spatio-temporal combined optimal model of the MES system to describe spatio-temporal coupling statuses of the energy storage vehicle, the traffic network, and the power distribution network. On this basis, uncertain factors such as traffic congestion are analyzed, and a rolling optimization framework of the MES system is constructed to correct a regulation strategy in real time. Based on real-time information of a vehicle-road network, rolling update and correction are performed on an optimal regulation strategy of the MES system, to maximally eliminate an excessive regulation deviation caused by various uncertain factors. The method for making a spatio-temporal combined optimal scheduling strategy of an MES system in the present disclosure can realize accurate modeling and efficient solving for a problem, and provide guidance for an optimal scheduling decision of the MES system, thereby supporting high-reliability operation of the power distribution network.

DETAILED DESCRIPTION

A method for making a spatio-temporal combined optimal scheduling strategy of an MES system in the present disclosure is described in more detail below with reference to embodiments and accompanying drawings.

Figure 1:
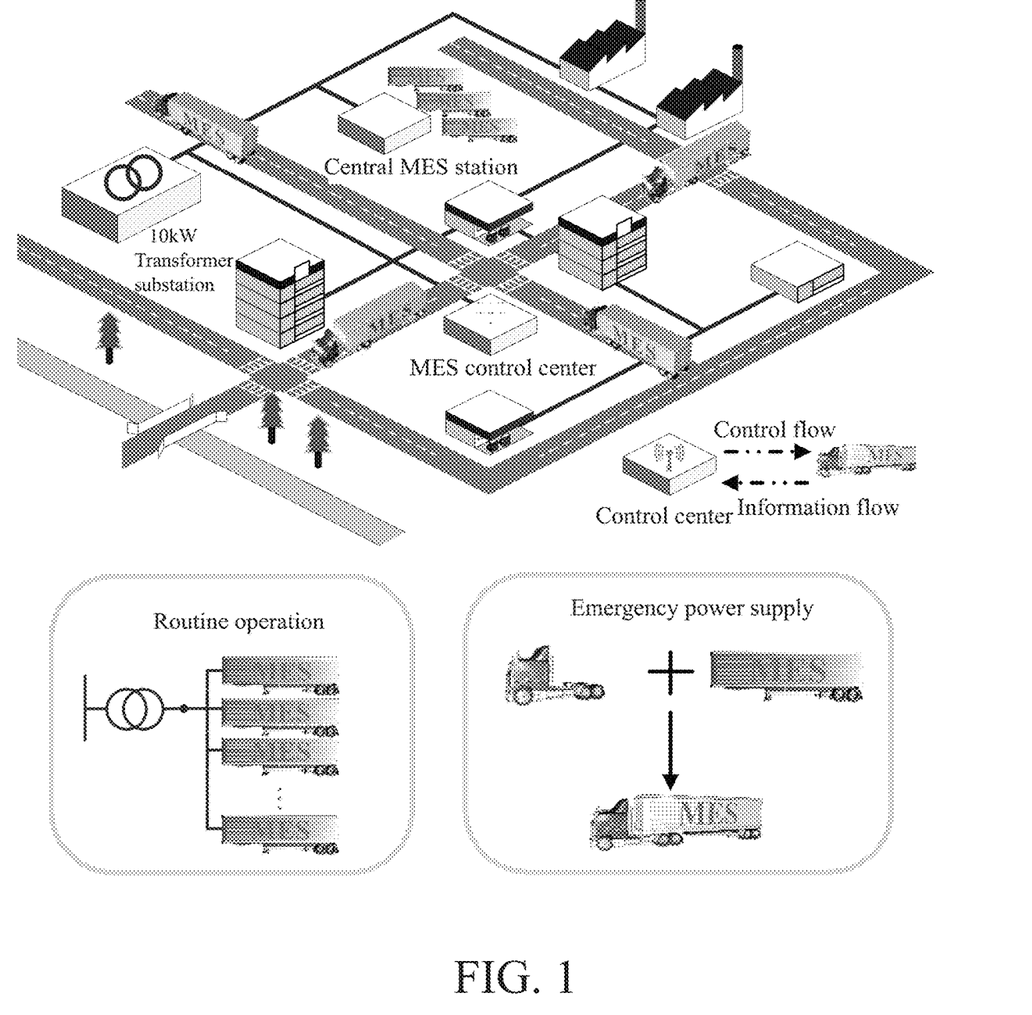
FIG. 1 is a schematic diagram of operation of an MES system.
Figure 2:
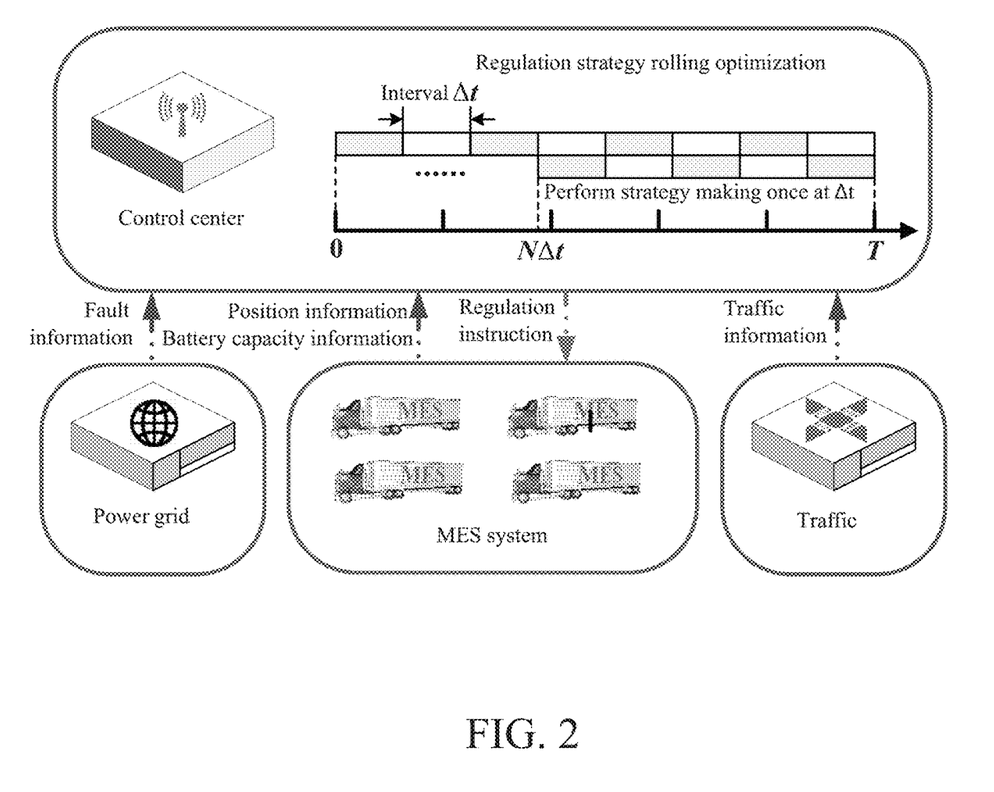
FIG. 2 is a framework diagram of rolling optimization of a spatio-temporal combined scheduling strategy of an MES system.
Figure 3:
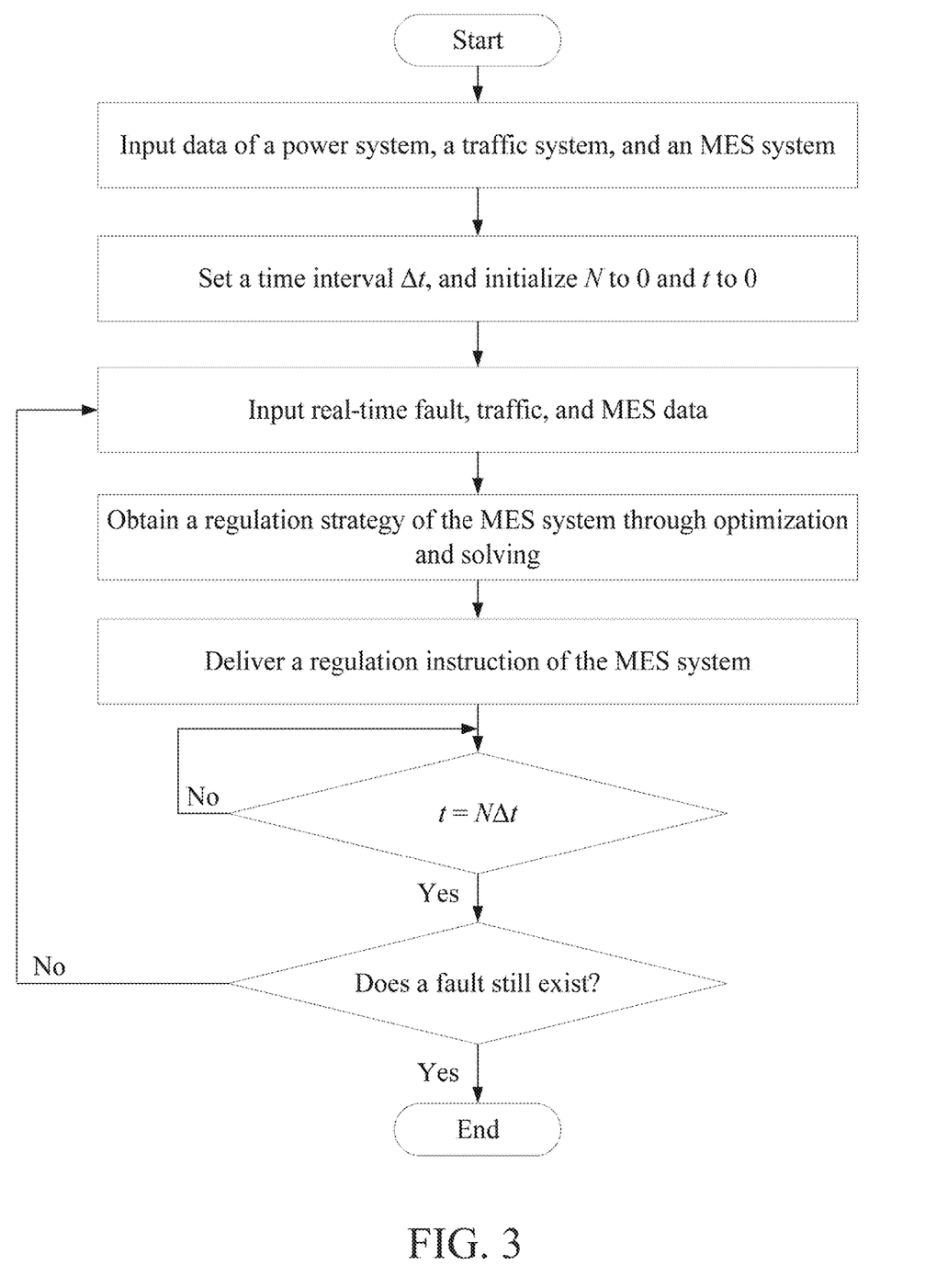
FIG. 3 is a flowchart of rolling optimization of a spatio-temporal combined scheduling strategy of an MES system.

A method for making a spatio-temporal combined optimal scheduling strategy of an MES system is provided. An operation mode of the MES system is shown in FIG. 1, and a framework and a process of rolling optimization of the spatio-temporal combined scheduling strategy of the MES system are shown in FIG. 2 and FIG. 3. The method includes the following steps:

Step 1: Input data of a power system, a traffic system, and the MES system. The input data specifically includes: a line parameter, load data, generator data, and a topological structure of the power system, a road parameter and a topological structure of the traffic system, a quantity of MES vehicles, a capacity of an MES battery, an upper limit of output active power, an upper limit of output reactive power, upper and lower capacity limits of the battery, charging and discharging efficiency of the battery, and an average traveling speed of an MES vehicle.

Step 2: Set a time interval Δt, and initialize a time interval counter N to 0 and initial time t to 0.

Step 3: Input real-time fault, traffic, and MES data. The input data specifically includes: a position of a power line fault, expected repair time, a road congestion coefficient of the traffic system, and a real-time position and battery capacity of the MES vehicle.

Step 4: Optimize and solve an optimal regulation model of the MES system, and deliver regulation decision instructions of the MES system, including a path instruction and a power instruction. A best regulation solution of the MES vehicle is obtained from a perspective of reliability under a constraint on coupling between a power distribution network and a traffic network, where corresponding optimal regulation instructions include a path instruction and a power instruction.

The optimal regulation model of the MES system is established, where an objective function of the model is set to a minimum load reduction in a time set [NΔt, T], and is specifically expressed as:

$$\min f = \sum_{t \in T} \sum_{i \in E_n} P_{i,t}^{LS} \Delta t + \lambda \sum_{t \in T} \sum_{ij \in E_b} r_{ij} I_{ij,t} \Delta t \quad (1)$$

where in the above formula, $E_n$ and $E_b$ represent a node set and a branch set in the power distribution network respectively, PLS i,t represents a load reduction of a node i at a time point t, $r_{ij}$ and $I_{ij,t}$ represent resistance of a branch ij and a square of a current of the branch ij at the time point t respectively, $\Delta t$ represents the time interval, the first item on the right represents a load reduction of the power distribution network, the second item on the right is used to ensure accuracy of solving the model after second-order cone relaxation optimization, and $\lambda$, represents a large positive number, and may be a real number greater than 10.

Model constraints are set, including a path traffic constraint, an energy storage battery constraint, and a power flow constraint of the power distribution network.

The path traffic constraint is that the MES vehicle needs to complete a traveling process according to the delivered path instruction. $p_{i,s,t}$ is a binary decision variable, indicating whether an MES system s is located on the node i at the time point t; and when $p_{i,s,t}=1$, it indicates that the MES system s is located on the node i at the time point t, as shown below:

$$\sum_{i \in W_n} p_{i,s,t} \leq 1 \quad (2)$$

$$\forall s \in \Omega_s, t \in T$$

where in the above formula, $W_n$ represents a set of nodes in the traffic network, $\Omega_s$ represents a set of MES vehicles, and a traveling track of the MES vehicle also needs to meet a constraint of the traffic network to ensure that the MES vehicle can reach an expected position within specified time, as shown below:

$$L_{i,j,t} = \text{round}\left(\sum_{k \in W_{ij}} \frac{d_k}{\gamma_{k,t} \cdot v}\right) \forall i, j \in W_n, t \in T \quad (3)$$

$$p_{i,s,t} + p_{j,s,t+\tau} \leq 1 \forall i \in W_n, j \in W_n,$$
$$\tau \in [1, \ldots, \min\{L_{i,j,t}, T-t\}], s \in \Omega_s \quad (4)$$

where in the above formulas, $L_{i,j,t}$ represents time required by the MES vehicle to travel from the node i to a node j at the time point t; $W_{ij}$ represents a set of roads within a least time-consuming path between the node i and the node j, and is obtained based on a floyd algorithm; $\gamma_{k,t}$ represents a congestion coefficient of a road k at the time point t, and is used to measure an actual traffic capacity of the road based on traffic congestion, road construction, and other factors; and $d_k$ and v represent a length of the road k and the average traveling speed of the MES vehicle respectively. $P_{j,s,t+\tau}$ represents whether the MES system s is located on the node j at the time point t.

The energy storage battery constraint is related to the power instruction, the power instruction indicates active discharging power PM i,s,t and reactive discharging power $Q$ M i,s,t of the energy storage battery after the MES vehicle reaches a destination and is connected to a power grid, and the energy storage battery constraint includes capacity constraints represented by formulas (5) and (6) and power constraints represented by formulas (7) to (9), as shown below:

$$E_{s,t} = E_{s,t-1} - \sum_{i \in E_n} \frac{P_{i,s,t}^M}{\eta_{dis}} \quad (5)$$

$$\forall i \in E_n, s \in \Omega_s, t \in T$$

$$\sigma_{min} E_s \leq E_{s,t} \leq \sigma_{max} E_s \quad (6)$$

$$\forall s \in \Omega_s, t \in T$$

$$-M \cdot p_{sta,s,t} \cdot P_s^{max} \leq P_{sta,s,t}^M \leq 0 \quad (7)$$

$$\forall s \in \Omega_s, t \in T$$

$$0 \leq \frac{P_{i,s,t}^M}{\eta_{dis}} \leq p_{j,s,t} \cdot P_s^{max} \quad (8)$$

$$\forall i \in E_n, j \in W_n, s \in \Omega_s, t \in T$$

$$-p_{j,s,t} Q_s^{max} \leq Q_{i,s,t}^M \leq p_{j,s,t} Q_s^{max} \quad (9)$$

$$\forall i \in E_n, j \in W_n, s \in \Omega_s, t \in T$$

where in the above formulas, $E_{s,t}$ represents a battery capacity of the MES system s at the time point t, PM i,s,t and $Q$ M i,s,t represent active and reactive charging and discharging power of the MES system s on the node i at the time point t respectively, $\eta_{dis}$ represents discharging efficiency, $E_s$ represents the capacity of the MES battery, $\sigma_{max}$ and $\sigma_{min}$ represent the upper and lower capacity limits of the MES battery respectively, Pmax s and $Q$ max s represent upper limits of active and reactive discharging power of the MES system s respectively, M represents a large positive number, and may be a real number greater than 100, and sta represents a position of a central MES station.

The power flow constraint of the power distribution network is that a power distribution system needs to meet power balance constraints represented by formulas (10) to (13) and operation safety constraints represented by formulas (14) and (15) after the MES system is orderly connected to the power distribution network in a plug and play manner, as shown below:

$$\sum_{ji \in E_b} (P_{ji,t} - r_{ij} I_{ji,t}) + P_{i,t}^L - P_{i,t}^{LS} - P_{i,t}^G - \sum_{s \in \Omega_s} P_{i,s,t}^M = \sum_{ik \in E_b} P_{ik,t} \quad (10)$$

$$\forall i \in E_n, s \in \Omega_s, t \in T$$

$$\sum_{ji \in E_b} (Q_{ji,t} - x_{ij} I_{ji,t}) + Q_{i,t}^L - Q_{i,t}^{LS} - Q_{i,t}^G - \sum_{s \in \Omega_s} Q_{i,s,t}^M = \sum_{ik \in E_b} Q_{ik,t} \quad (11)$$

$$\forall i \in E_n, s \in \Omega_s, t \in T$$

$$U_{i,t} - U_{j,t} + (r_{ij}^2 + x_{ij}^2) I_{ij,t} - 2(r_{ij} P_{ij,t} + x_{ij} Q_{ij,t}) = 0 \quad (12)$$

$$\forall i \in E_n, j \in E_n, ij \in E_b, t \in T$$

$$\|[2P_{ij,t} \; 2Q_{ij,t} \; I_{ij,t} \; -U_{i,t}]^T\|_2 \leq I_{ij,t} + U_{i,t} \quad (13)$$

$$\forall i \in E_n, ij \in E_b, t \in T$$

where in the above formulas, $x_j$ represents reactance of the branch if, $P_{ij,t}$ and $Q_{ij,t}$ represent active power and reactive power flowing from the node i to the node j at the time point t respectively, $U_{i,t}$ represents a square of a voltage of the node i at the time point t, PL i,t and $Q$ L i,t represent active power and reactive power of load on the node i at the time point t respectively, PLS i,t and $Q$ LS i,t respectively represent active power and reactive power that are reduced for the load on the node i at the time point t, and PG i,t and Q G i,t respectively represent active power and reactive power that are injected by a generator on the node i at the time point t; and $$U_i^{min} \leq U_{i,t} \leq U_i^{max} \forall i \in E_n, t \in T \quad (14)$$

$$I_{ij,t} \leq I_{ij}^{max} \forall ij \in E_b, t \in T \quad (15)$$

where in the above formulas, Umax i and Umin i represent upper and lower limits of a square of a voltage of the node i respectively, and Imax ij represents a square of a maximum allowable current of the branch ij.

Step 5: If the fault still exists after NΔt, set N=N+1, and return to step 3; otherwise, terminate a process of making a scheduling strategy.

The method for making a spatio-temporal combined optimal scheduling strategy of an MES system in the present disclosure realizes a rolling optimal scheduling decision of each MES vehicle when a fault occurs, fully excavates a support potentiality of flexibility of the MES system for system reliability, and provides guidance for making a scheduling strategy of the MES system.

Figure 4:
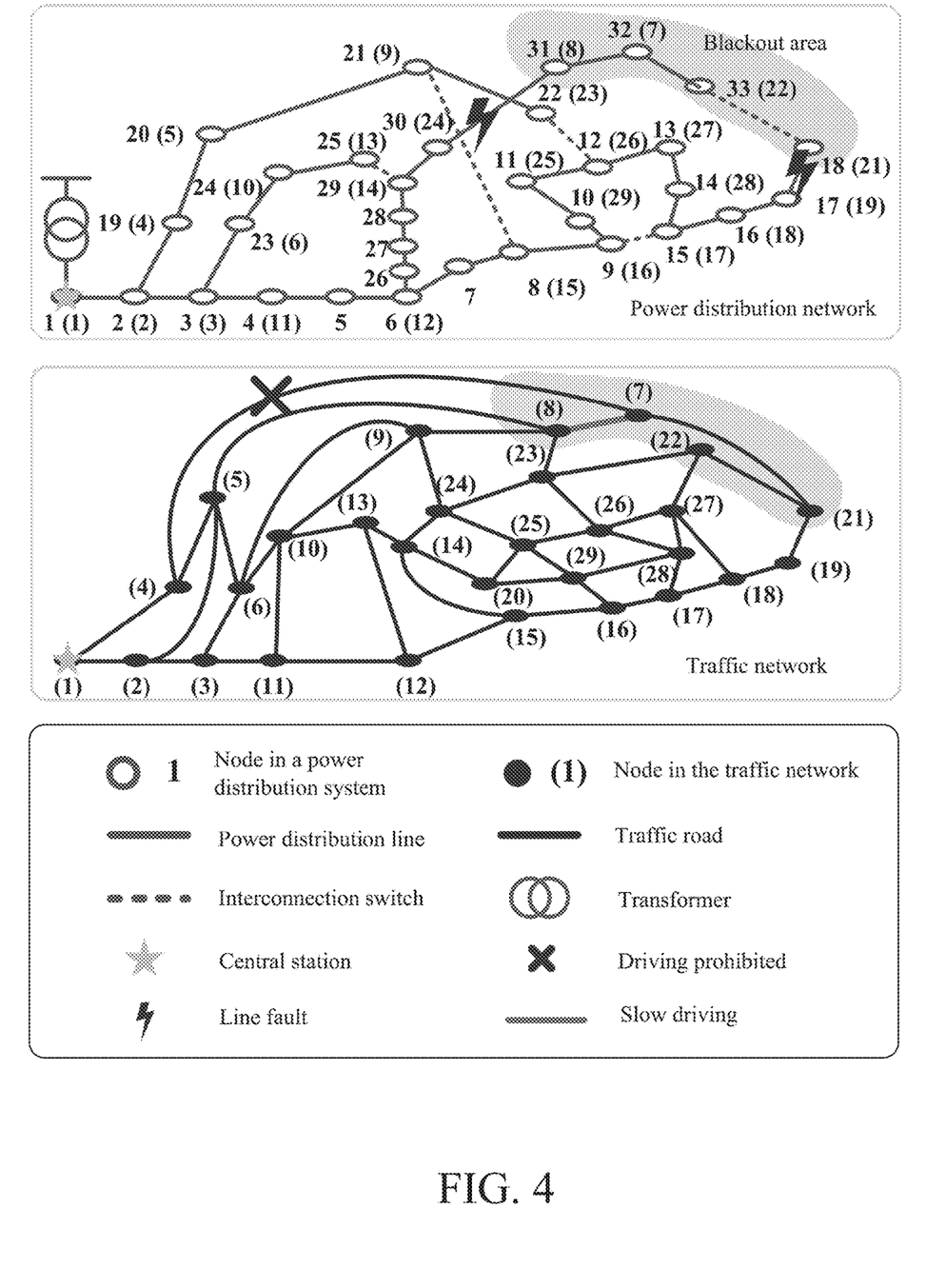
FIG. 4 is a schematic diagram of a topology of a test system.

In the embodiment of the present disclosure, some trunk roads in an urban area of a city are selected as the traffic network including 29 nodes and 49 roads, and a standard power distribution network composed of IEEE33 nodes is used as a test power distribution system. The power distribution network includes 33 nodes, one generator, and 37 branches. A topological relationship between the traffic network and the power distribution network is shown in FIG. 4. For example, three MES vehicles (MES 1, MES 2, and MES 3) are disposed, and each of them adopts a container-type lithium iron phosphate battery. For related parameters, refer to Table 1. The central MES station is located on node 1. Scheduling solutions of the MES system in four scenarios are analyzed and compared. FIG. 5 to FIG. 8 show results of optimal regulation strategies of the MES system in these scenarios.

In scenario 1, power cuts of lines (30, 31) and (17, 18) are scheduled 3 h in advance, and estimated fault repair time is 5 h.

In scenario 2, lines (30, 31) and (17, 18) are in a power-cut state, and estimated fault repair time is 5 h.

In scenario 3, at a first time point in scenario 2, driving on a road (4, 7) is prohibited, and a congestion coefficient of a road (7, 8) is 30%.

In scenario 4, a fault is the same as the fault in scenario 2, and the time interval is 15 min.

Impact of a line fault type is analyzed as follows:

In scenario 1, destinations of the MES vehicles are nodes 18, 31, and 32 respectively. A shortest moving path is 1→19→32→18 for MES 1, 1→19→20→31 for MES 2, and 1→19→32→19→1→19→32 for MES 3. The three MES vehicles are charged in advance and connected to the power grid in a full-capacity manner when the fault occurs. MES 3 returns to the central station at a fifth time point to use a new full-capacity battery. According to the above regulation strategy, the system has no load reduction. It can be learned from FIG. 5 that under this strategy, the MES system directly supplies power to the nodes (18, 31, 32) with heaviest load, to reduce a line loss. For related line power in a whole process, refer to Table 2.

In scenario 2, a moving path is 1→19→20→31 for MES 1, 1→19→20→31→19→20→1→19→32 for MES 2, and 1→19→32→18→33→18→32→19→1→19→32→18 for MES 3, and load of the system is reduced by 0.255 MWh. After the fault occurs, nodes 18, 31, 32, and 33 form an isolated network, and a load of 0.51 MW cannot be supplied. Because maximum power supply power of a single MES vehicle is 0.3 MW, at least two MES vehicles need to be connected to the power grid at the same time to meet the electrical load. As a result, MES 2 and MES 3 go to the destination immediately, with a primary goal of minimizing a load reduction, and then return to the central station after 1.5 h and 2.5 h respectively to replace their own batteries. Referring to the regulation strategy in scenario 1, when the battery capacity is sufficient, an optimal access point of the MES vehicle is still a main load point due to a line transmission loss. Table 3 shows related line power in scenario 2.

Figure 5:
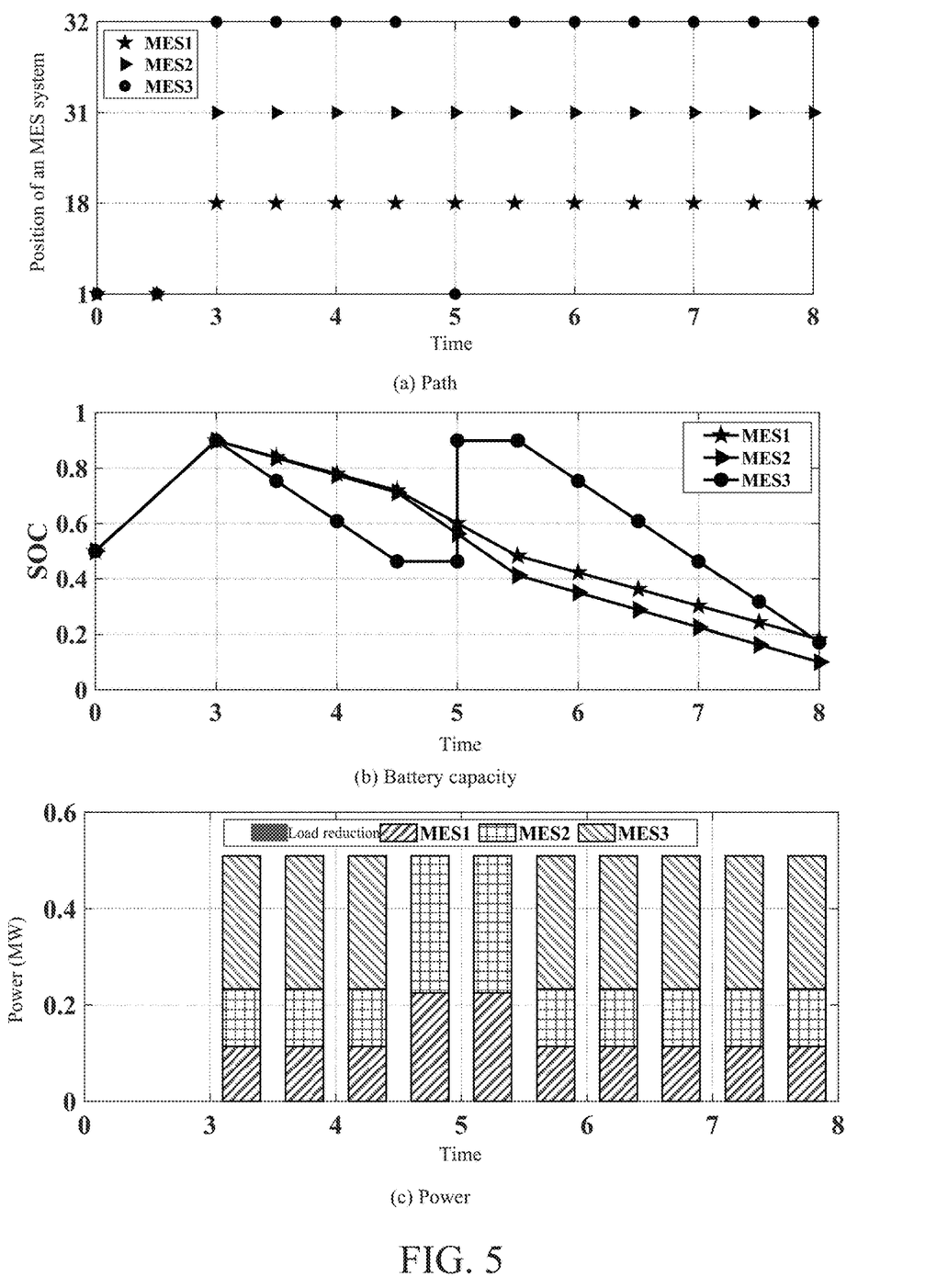
FIG. 5 shows an optimal regulation strategy of an MES system in scenario 1.
Figure 6:
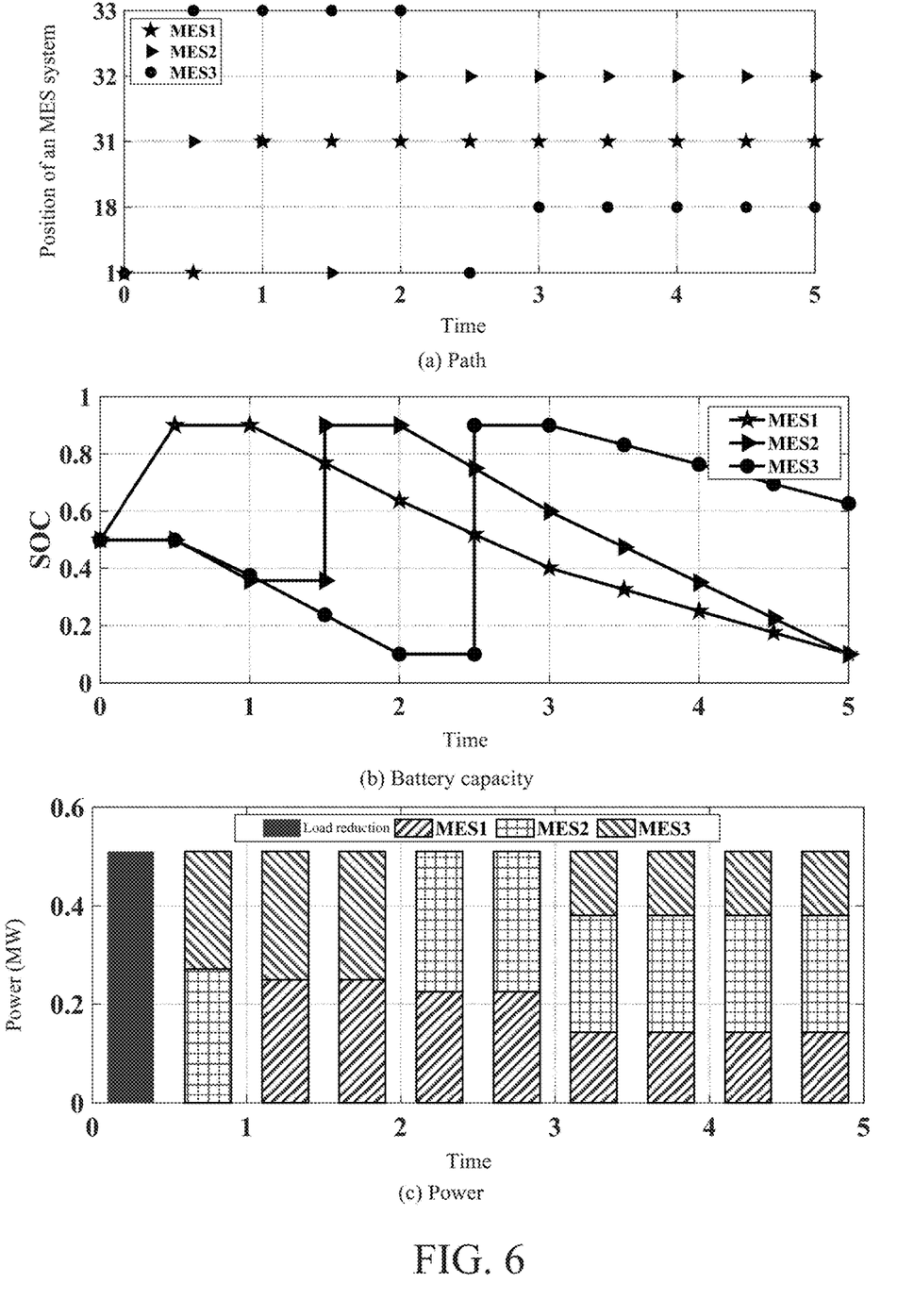
FIG. 6 shows an optimal regulation strategy of an MES system in scenario 2.

It can be learned by comparing FIG. 5 and FIG. 6 that in case of a pre-scheduled power cut, regulation space of the MES system is more abundant, and more emergency support can be provided for the system. In addition, the battery capacity and fault duration are key factors affecting the path instruction of the MES system. If an MES vehicle returns to the central station to replace the battery, load of a corresponding node is supplied by an MES vehicle of another node, which may cause a line transmission loss. Therefore, a fewer quantity of times that the MES vehicle replaces the battery leads to a less power transmission loss. It can be learned that the proposed regulation strategy of the MES system can ensure a minimum load reduction and a minimum transmission loss at the same time.

Figure 7:
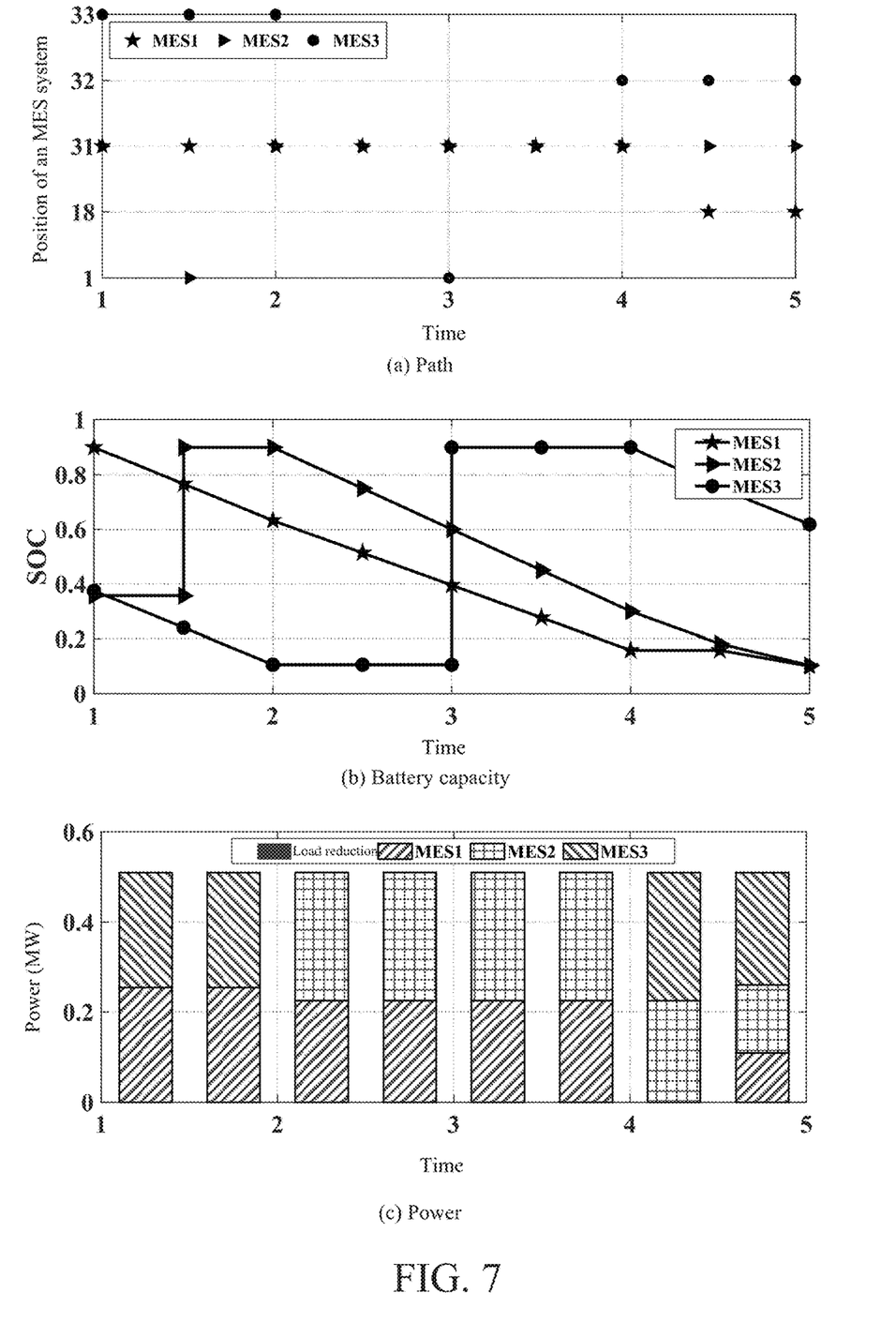
FIG. 7 shows an optimal regulation strategy of an MES system in scenario 3.
Figure 8:
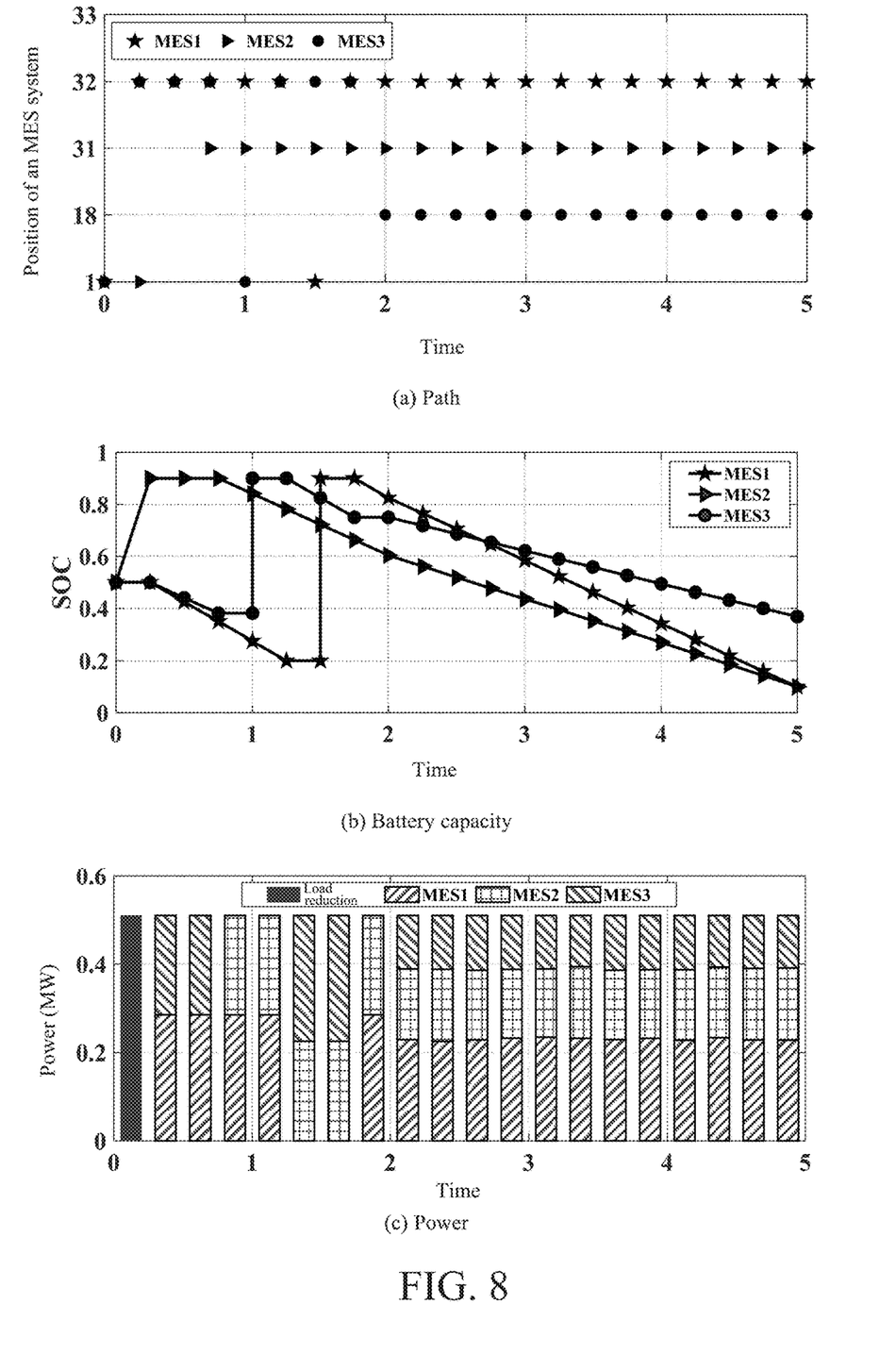
FIG. 8 shows an optimal regulation strategy of an MES system in scenario 4.

Impact of a traffic network fault is analyzed as follows:

In scenario 3, due to congestion in the traffic network, a moving path is 31→22→33→18 for MES 1, 31→20→19→1→19→20→31 for MES 2, and 33→22→31→20→19→1→19→20→31→32 for MES 3. To ensure that there is no load reduction in the system, both MES 1 and MES 2 are connected to node 31, because a path from the central station to node 31 is least time-consuming. Then, to reduce a transmission loss, the MES vehicles are connected to nodes 18, 31, and 32 respectively. FIG. 6 and FIG. 7 show that the proposed rolling optimization model can fully consider uncertain factors such as the traffic network fault and modify the regulation strategy in real time, thereby realizing efficient access of the MES system.

Impact of scheduling time is analyzed as follows:

In scenario 4, a moving path is 1→19→32→19→1→19→32 for MES 1, 1→19→20→31 for MES 2, and 1→19→32→19→1→19→32→18 for MES 3. The regulation time is reduced to more accurately predict operation time of the path, and a path from the central station to node 32 is the shortest, so that the MES vehicles are first connected to node 32, thereby ensuring a minimum load reduction of the system. Correspondingly, to reduce a network loss, the MES vehicles are finally connected to nodes 18, 31, and 32 respectively, which is consistent with the strategies in scenarios 1 to 3. To sum up, proper optimal regulation time needs to be set with reference to an actual site situation, while accuracy of the regulation instruction is improved.

It should be emphasized that the embodiment in the present disclosure is illustrative rather than restrictive. Therefore, the present disclosure includes but is not limited to the embodiment in the detailed description. All other implementations obtained by those skilled in the art according to the technical solutions of the present disclosure also fall within the protection scope of the present disclosure.

TABLE 1

Parameter setting

| Parameter name | Value |
| --- | --- |
| Capacity $E_s$ of an energy storage battery (MWh) | 1 |
| Upper capacity limit $\sigma_{max}$ of the battery (%) | 90 |
| Lower capacity limit $\sigma_{min}$ of the battery (%) | 10 |
| Discharging efficiency $\eta_{dis}$ of the battery (%) | 95 |
| Maximum active discharging power Pmax s (MW) | 0.3 |
| Maximum reactive discharging power Qmax s (Mvar) | 0.3 |
| Time interval $\Delta t$ (h) | 0.5 |
| Average traveling speed v of an MES vehicle (km/h) | 20 |

TABLE 2

Line power (MW) in scenario 1

| Line | Time (h) | | | | | |
| --- | --- | --- | --- | --- | --- | --- |
|  | 0 | 1 | 2 | 3 | 4 | 5 |
| 31-32 | 0 | −0.031 | −0.031 | 0.145 | 0.135 | −0.031 |
| 32-33 | 0 | 0.036 | 0.036 | −0.075 | −0.075 | 0.036 |
| 18-33 (interconnection switch) | 0 | 0.024 | 0.024 | 0.135 | 0.135 | 0.024 |

TABLE 3

Line power (MW) in scenario 2

| Line | Time (h) | | | | | |
| --- | --- | --- | --- | --- | --- | --- |
|  | 0 | 1 | 2 | 3 | 4 | 5 |
| 31-32 | 0 | 0.122 | 0.099 | 0.075 | −0.007 | −0.007 |
| 32-33 | 0 | −0.088 | −0.111 | 0.15 | 0.02 | 0.020 |
| 18-33 (interconnection switch) | 0 | −0.09 | −0.09 | −0.09 | 0.04 | 0.040 |

TABLE 4

Node parameters of an IEEE 33 node system

| Node No. | Node type | Active load (MW) | Reactive load (MVar) | Reference voltage (kV) | Upper voltage limit (p.u.) | Lower voltage limit (p.u.) |
| --- | --- | --- | --- | --- | --- | --- |
| 1 | 3 | 0 | 0 | 12.66 | 1.05 | 0.95 |
| 2 | 1 | 0.1 | 0.06 | 12.66 | 1.05 | 0.95 |
| 3 | 1 | 0.09 | 0.04 | 12.66 | 1.05 | 0.95 |
| 4 | 1 | 0.12 | 0.08 | 12.66 | 1.05 | 0.95 |
| 5 | 1 | 0.06 | 0.03 | 12.66 | 1.05 | 0.95 |
| 6 | 1 | 0.06 | 0.02 | 12.66 | 1.05 | 0.95 |
| 7 | 1 | 0.2 | 0.1 | 12.66 | 1.05 | 0.95 |
| 8 | 1 | 0.2 | 0.1 | 12.66 | 1.05 | 0.95 |
| 9 | 1 | 0.06 | 0.02 | 12.66 | 1.05 | 0.95 |
| 10 | 1 | 0.06 | 0.02 | 12.66 | 1.05 | 0.95 |
| 11 | 1 | 0.045 | 0.03 | 12.66 | 1.05 | 0.95 |
| 12 | 1 | 0.06 | 0.035 | 12.66 | 1.05 | 0.95 |
| 13 | 1 | 0.06 | 0.035 | 12.66 | 1.05 | 0.95 |
| 14 | 1 | 0.12 | 0.08 | 12.66 | 1.05 | 0.95 |
| 15 | 1 | 0.06 | 0.01 | 12.66 | 1.05 | 0.95 |
| 16 | 1 | 0.06 | 0.02 | 12.66 | 1.05 | 0.95 |
| 17 | 1 | 0.06 | 0.02 | 12.66 | 1.05 | 0.95 |
| 18 | 1 | 0.09 | 0.04 | 12.66 | 1.05 | 0.95 |
| 19 | 1 | 0.09 | 0.04 | 12.66 | 1.05 | 0.95 |
| 20 | 1 | 0.09 | 0.04 | 12.66 | 1.05 | 0.95 |
| 21 | 1 | 0.09 | 0.04 | 12.66 | 1.05 | 0.95 |
| 22 | 1 | 0.09 | 0.04 | 12.66 | 1.05 | 0.95 |
| 23 | 1 | 0.09 | 0.05 | 12.66 | 1.05 | 0.95 |
| 24 | 1 | 0.42 | 0.2 | 12.66 | 1.05 | 0.95 |
| 25 | 1 | 0.42 | 0.2 | 12.66 | 1.05 | 0.95 |
| 26 | 1 | 0.06 | 0.025 | 12.66 | 1.05 | 0.95 |
| 27 | 1 | 0.06 | 0.025 | 12.66 | 1.05 | 0.95 |
| 28 | 1 | 0.06 | 0.02 | 12.66 | 1.05 | 0.95 |
| 29 | 1 | 0.12 | 0.07 | 12.66 | 1.05 | 0.95 |
| 30 | 1 | 0.2 | 0.6 | 12.66 | 1.05 | 0.95 |
| 31 | 1 | 0.15 | 0.07 | 12.66 | 1.05 | 0.95 |
| 32 | 1 | 0.21 | 0.1 | 12.66 | 1.05 | 0.95 |
| 33 | 1 | 0.06 | 0.04 | 12.66 | 1.05 | 0.95 |

Values 1, 2, and 3 of the node type represent a PQ node, a PV node, and a slack bus respectively.

TABLE 5

Generator parameters of an IEEE 33 node system

| Generator position | Upper limit of an active power output (MW) | Lower limit of the active power output (MW) | Upper limit of a reactive power output (MVar) | Lower limit of the reactive power output (MVar) |
| --- | --- | --- | --- | --- |
| 1 | 10 | 0 | 10 | −10 |

TABLE 6

Power line parameters of an IEEE 33 node system

| Line No. | Start node | End node | Resistance (p.u.) | Reactance (p.u.) |
| --- | --- | --- | --- | --- |
| 1 | 1 | 2 | 0.005753 | 0.002932 |
| 2 | 2 | 3 | 0.03076 | 0.015667 |
| 3 | 3 | 4 | 0.022836 | 0.01163 |
| 4 | 4 | 5 | 0.023778 | 0.01211 |
| 5 | 5 | 6 | 0.051099 | 0.044112 |
| 6 | 6 | 7 | 0.01168 | 0.038608 |
| 7 | 7 | 8 | 0.044386 | 0.014668 |
| 8 | 8 | 9 | 0.064264 | 0.04617 |
| 9 | 9 | 10 | 0.065138 | 0.04617 |
| 10 | 10 | 11 | 0.012266 | 0.004056 |
| 11 | 11 | 12 | 0.02336 | 0.007724 |
| 12 | 12 | 13 | 0.091592 | 0.072063 |
| 13 | 13 | 14 | 0.033792 | 0.04448 |
| 14 | 14 | 15 | 0.036874 | 0.032818 |
| 15 | 15 | 16 | 0.046564 | 0.034004 |
| 16 | 16 | 17 | 0.080424 | 0.107378 |
| 17 | 17 | 18 | 0.02321 | 0.035813 |
| 18 | 2 | 19 | 0.010232 | 0.009764 |
| 19 | 19 | 20 | 0.093851 | 0.084567 |
| 20 | 20 | 21 | 0.02555 | 0.029849 |
| 21 | 21 | 22 | 0.04423 | 0.058481 |
| 22 | 3 | 23 | 0.028152 | 0.019236 |
| 23 | 23 | 24 | 0.056028 | 0.044243 |
| 24 | 24 | 25 | 0.055904 | 0.043743 |
| 25 | 6 | 26 | 0.012666 | 0.006451 |
| 26 | 26 | 27 | 0.017732 | 0.009028 |
| 27 | 27 | 28 | 0.066074 | 0.058256 |
| 28 | 28 | 29 | 0.050176 | 0.043712 |
| 29 | 29 | 30 | 0.031664 | 0.016128 |
| 30 | 30 | 31 | 0.060795 | 0.060084 |
| 31 | 31 | 32 | 0.019373 | 0.02258 |
| 32 | 32 | 33 | 0.021276 | 0.033455 |
| 33 | 8 | 21 | 0.124785 | 0.124785 |
| 34 | 9 | 15 | 0.124785 | 0.124785 |
| 35 | 12 | 22 | 0.124785 | 0.124785 |

TABLE 6-continued

Power line parameters of an IEEE 33 node system

| Line No. | Start node | End node | Resistance (p.u.) | Reactance (p.u.) |
|---|---|---|---|---|
| 36 | 18 | 33 | 0.031196 | 0.031196 |
| 37 | 25 | 29 | 0.031196 | 0.031196 |

TABLE 7

Corresponding table of node numbers of a power distribution network and a traffic network

| Node in the power distribution network | Node in the traffic network | Node in the power distribution network | Node in the traffic network | Node in the power distribution network | Node in the traffic network |
|---|---|---|---|---|---|
| 1 | 1 | 12 | 26 | 23 | 6 |
| 2 | 2 | 13 | 27 | 24 | 10 |
| 3 | 3 | 14 | 28 | 25 | 13 |
| 4 | 11 | 15 | 17 | 26 | — |
| 5 | — | 16 | 18 | 27 | — |
| 6 | 12 | 17 | 19 | 28 | — |
| 7 | — | 18 | 21 | 29 | 14 |
| 8 | 15 | 19 | 4 | 30 | 24 |
| 9 | 16 | 20 | 5 | 31 | 8 |
| 10 | 29 | 21 | 9 | 32 | 7 |
| 11 | 25 | 22 | 23 | 33 | 22 |

Note:
"—" indicates that the node in the power distribution network is not coupled to the node in the traffic network.

TABLE 8

Road parameters of a traffic system

| Start node | End node | Road length | Start node | End node | Road length |
|---|---|---|---|---|---|
| 1 | 2 | 2 | 14 | 20 | 2.2 |
| 1 | 4 | 1.7 | 14 | 24 | 3 |
| 2 | 3 | 2.2 | 15 | 16 | 5.8 |
| 2 | 5 | 1.8 | 16 | 17 | 9.2 |
| 3 | 6 | 1.8 | 16 | 29 | 3.4 |
| 3 | 11 | 3.3 | 17 | 18 | 2.6 |
| 4 | 5 | 2 | 17 | 28 | 5.3 |
| 4 | 7 | 2.3 | 18 | 19 | 2.4 |
| 5 | 6 | 2.1 | 18 | 27 | 4.5 |
| 5 | 8 | 1.7 | 19 | 21 | 2.6 |
| 6 | 9 | 2.7 | 20 | 25 | 2.8 |
| 6 | 10 | 2.6 | 20 | 29 | 4.4 |
| 7 | 8 | 2.8 | 21 | 22 | 2.7 |
| 7 | 21 | 3 | 22 | 23 | 2.3 |
| 8 | 9 | 2.8 | 22 | 27 | 2.6 |
| 8 | 23 | 2.6 | 23 | 24 | 3.6 |
| 9 | 10 | 2.2 | 23 | 26 | 2.2 |
| 9 | 24 | 2.1 | 24 | 25 | 3.7 |
| 10 | 11 | 1.9 | 25 | 26 | 2.4 |
| 10 | 13 | 4 | 25 | 29 | 1.4 |
| 11 | 12 | 4 | 26 | 27 | 2.2 |
| 12 | 13 | 1.5 | 26 | 28 | 1.8 |
| 12 | 15 | 6.6 | 27 | 28 | 1.8 |
| 13 | 14 | 3.6 | 28 | 29 | 2.4 |
| 14 | 15 | 2.6 | | | |

The invention claimed is:

1. A method for making a spatio-temporal combined optimal scheduling strategy of a mobile energy storage (MES) system, comprising the following steps:
    step 1: inputting data of a power system, a traffic system, and an MES system, specifically comprising: a line parameter, load data, generator data, and a topological structure of the power system, a road parameter and a topological structure of the traffic system, a quantity of MES vehicles, a capacity of an MES battery, an upper limit of output active power, an upper limit of output reactive power, upper and lower capacity limits of the battery, charging and discharging efficiency of the battery, and an average traveling speed of an MES vehicle;
    step 2: setting a time interval $\Delta t$, and initializing a time interval counter N to 0 and initial time t to 0;
    step 3: inputting real-time fault, traffic, and MES data, specifically comprising: a position of a power line fault, expected repair time, a road congestion coefficient of the traffic system, and a real-time position and battery capacity of the MES vehicle;
    step 4: optimizing and solving an optimal regulation model of the MES system, and delivering regulation decision instructions of the MES system, comprising a path instruction and a power instruction; regulate the MES system based on the regulation decision instructions; and
    step 5: if the fault still exists after $N\Delta t$, setting $N=N+1$, and returning to step 3; otherwise, terminating a process of making a scheduling strategy.

2. The method for making a spatio-temporal combined optimal scheduling strategy of an MES system according to claim 1, wherein step 4 comprises:
    establishing the optimal regulation model of the MES system, wherein an objective function of the model is set to a minimum load reduction in a time set $[N\Delta t, T]$, and is specifically expressed as:

$$\min f = \sum_{t \in T} \sum_{i \in E_n} P_{i,t}^{LS} \Delta t + \lambda \sum_{t \in T} \sum_{ij \in E_b} r_{ij} I_{ij,t} \Delta t \quad (1)$$

wherein in the formula (1), $E_n$ and $E_b$ represent a node set and a branch set in a power distribution network respectively, PLS i,t represents a load reduction of a node i at a time point t, $r_{ij}$ and $I_{ij,t}$ represent resistance of a branch ij and a square of a current of the branch ij at the time point t respectively, $\Delta t$ represents the time interval, $$\sum_{t \in T} \sum_{ij \in E_b} P_{i,t}^{LS} \Delta t$$

represents a load reduction of the power distribution network, $$\lambda \sum_{t \in T} \sum_{ij \in E_b} r_{ij} I_{i,j,t} \Delta t$$

is used to ensure accuracy of solving the model after second-order cone relaxation optimization, and $\lambda$ represents a real number greater than 10; and
    setting model constraints, comprising a path traffic constraint, an energy storage battery constraint, and a power flow constraint of the power distribution network, wherein
    the path traffic constraint is that the MES vehicle needs to complete a traveling process according to the delivered path instruction; $p_{i,s,t}$ is a binary decision variable, indicating whether an MES system s is located on the node i at the time point t; and when $p_{i,s,t}=1$, it indicates that the MES system s is located on the node i at the time point t;

$$\sum_{i \in W_n} p_{i,s,t} \leq 1 \quad (2)$$

$$\forall s \in \Omega_s, t \in T$$

wherein in the formula (2), $W_n$ represents a set of nodes in a traffic network, $\Omega_s$ represents a set of MES vehicles, and a traveling track of the MES vehicle also needs to meet a constraint of the traffic network to ensure that the MES vehicle can reach an expected position within specified time, as shown below:

$$L_{i,j,t} = \text{round}\left(\sum_{k \in W_{ij}} \frac{d_k}{\gamma_{k,t} \cdot v}\right) \forall i, j \in W_n, t \in T \quad (3)$$

$$p_{i,s,t} + p_{j,s,t+\tau} \leq 1 \forall i \in W_n, j \in W_n, \tau \in [1, \ldots, \min\{L_{i,j,t}, T-t\}], s \in \Omega_s \quad (4)$$

wherein in the formulas (3) and (4), $L_{i,j,t}$ represents time required by the MES vehicle to travel from the node i to a node j at the time point t; $W_{ij}$ represents a set of roads within a least time-consuming path between the node i and the node j, and is obtained based on a floyd algorithm; $\gamma_{k,t}$ represents a congestion coefficient of a road k at the time point t, and is used to measure an actual traffic capacity of the road based on traffic congestion, road construction, and other factors; $d_k$ and v represent a length of the road k and the average traveling speed of the MES vehicle respectively; and $P_{j,s,t+\tau}$ represents whether the mobile storage energy system s is located on the node j at the time point t; the energy storage battery constraint is related to the power instruction, the power instruction indicates active discharging power PM i,s,t and reactive discharging power $Q$ M i,s,t of the energy storage battery after the MES vehicle reaches a destination and is connected to a power grid, and the energy storage battery constraint comprises capacity constraints represented by formulas (5) and (6) and power constraints represented by formulas (7) to (9), as shown below:

$$E_{s,t} = E_{s,t-1} - \sum_{i \in E_n} \frac{P^M_{i,s,t}}{\eta_{dis}} \quad (5)$$

$$\forall i \in E_n, s \in \Omega_s, t \in T$$

$$\sigma_{min} E_s \leq E_{s,t} \leq \sigma_{max} E_s \quad (6)$$

$$\forall s \in \Omega_s, t \in T$$

$$-M \cdot p_{sta,s,t} \cdot P^{max}_s \leq P^M_{sta,s,t} \leq 0 \quad (7)$$

$$\forall s \in \Omega_s, t \in T$$

$$0 \leq \frac{P^M_{i,s,t}}{\eta_{dis}} \leq p_{j,s,t} \cdot P^{max}_s \quad (8)$$

$$\forall i \in E_n, j \in W_n, s \in \Omega_s, t \in T$$

$$-p_{j,s,t} Q^{max}_s \leq Q^M_{i,s,t} \leq p_{j,s,t} Q^{max}_s \quad (9)$$

$$\forall i \in E_n, j \in W_n, s \in \Omega_s, t \in T$$

wherein in the formulas (5) to (9), $E_{s,t}$ represents a battery capacity of the MES system s at the time point t, PM i,s,t and $Q$ M i,s,t represent active and reactive charging and discharging power of the MES system s on the node i at the time point t respectively, $\eta_{dis}$ represents discharging efficiency, $E_s$ represents the capacity of the MES battery, $\sigma_{max}$ and $\sigma_{min}$ represent the upper and lower capacity limits of the MES battery respectively, Pmax s and $Q$ max s represent upper limits of active and reactive discharging power of the MES system s respectively, M represents a real number greater than 100, and sta represents a position of a central MES station; and the power flow constraint of the power distribution network is that a power distribution system needs to meet power balance constraints represented by formulas (10) to (13) and operation safety constraints represented by formulas (14) and (15) after the MES system is orderly connected to the power distribution network in a plug and play manner, as shown below:

$$\sum_{ji \in E_b} (P_{ji,t} - r_{ij} I_{ji,t}) + P^L_{i,t} - P^{LS}_{i,t} - P^G_{i,t} - \sum_{s \in \Omega_s} P^M_{i,s,t} = \sum_{ik \in E_b} P_{ik,t} \quad (10)$$

$$\forall i \in E_n, s \in \Omega_s, t \in T$$

$$\sum_{ji \in E_b} (Q_{ji,t} - x_{ij} I_{ji,t}) + Q^L_{i,t} - Q^{LS}_{i,t} - Q^G_{i,t} - \sum_{s \in \Omega_s} Q^M_{i,s,t} = \sum_{ik \in E_b} Q_{ik,t} \quad (11)$$

$$\forall i \in E_n, s \in \Omega_s, t \in T$$

$$U_{i,t} - U_{j,t} + (r^2_{ij} + x^2_{ij}) I_{ij,t} - 2(r_{ij} P_{ij,t} + x_{ij} Q_{ij,t}) = 0 \quad (12)$$

$$\forall i \in E_n, j \in E_n, ij \in E_b, t \in T$$

$$\|[2P_{ij,t} \quad 2Q_{ij,t} \quad I_{ij,t} - U_{i,t}]^T\|_2 \leq I_{ij,t} + U_{i,t} \quad (13)$$

$$\forall i \in E_n, ij \in E_b, t \in T$$

wherein in the formulas (10) to (13), $x_{ij}$ represents reactance of the branch ij, $P_{ij,t}$ and $Q_{ij,t}$ represent active power and reactive power flowing from the node i to the node j at the time point t respectively, $U_{i,t}$ represents a square of a voltage of the node i at the time point t, PL i,t and $Q$ L i,t represent active power and reactive power of load on the node i at the time point t respectively, PLS i,t and $Q$ LS i,t respectively represent active power and reactive power that are reduced for the load on the node i at the time point t, and PG i,t and $Q$ G i,t respectively represent active power and reactive power that are injected by a generator on the node i at the time point t; and $$U^{min}_i \leq U_{i,t} \leq U^{max}_i \forall i \in E_n, t \in T \quad (14)$$

$$I_{ij,t} \leq I^{max}_{ij} \forall ij \in E_b, t \in T \quad (15)$$

wherein in the formulas (14) and (15), Umax i and Umin i represent upper and lower limits of a square of a voltage of the node i respectively, and Imax ij represents a square of a maximum allowable current of the branch ij.

* * * * *